April 24, 1928.
W. GOETZELMAN
CLAMP FOR CONNECTION BOXES
Filed Aug. 30, 1926
1,667,688
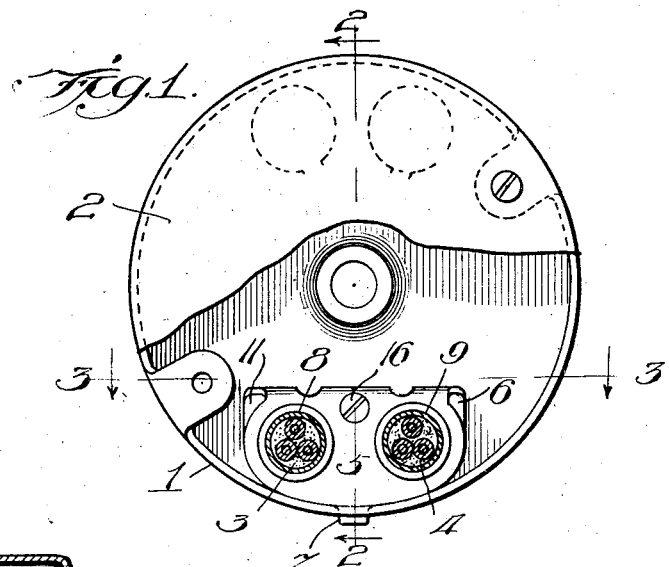
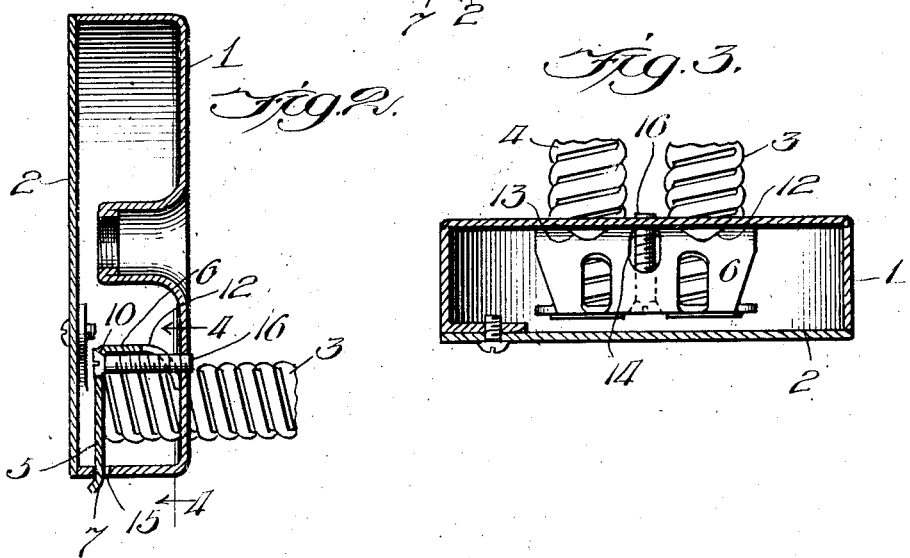
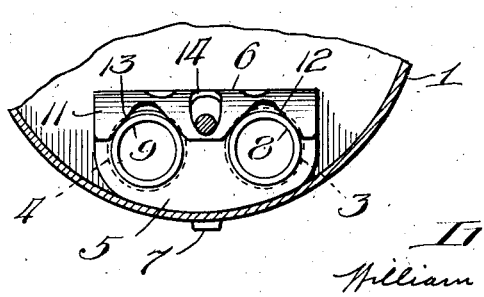
Inventor:
William Goetzelman,
by Wm. G. Freudenreich,
Atty Patented Apr. 24, 1928.

1,667,688

UNITED STATES PATENT OFFICE.

WILLIAM GOETZELMAN, OF CHICAGO, ILLINOIS, ASSIGNOR TO APPLETON ELECTRIC COMPANY, A CORPORATION OF ILLINOIS.

CLAMP FOR CONNECTION BOXES.

Application filed August 30, 1926. Serial No. 132,649.

The present invention has for its object to produce a simple and novel clamping device for firmly securing the ends of conduits or other members in connection boxes.

A further object of the present invention is to produce a simple and novel clamping device which may be applied or removed through the open side of a connection box so as to be accessible when the box is embedded in plaster or in a wall.

In carrying out my invention I employ an angle-shaped metal plate having at one edge means, such as a lip, for example to interlock with the side wall of a connection box and form a rocking connection for the plate; the other wing having an inturned edge preferably notched to fit over the side of one or more conduits or cables entering the box through the bottom. When the clamping plate is in place one wing may be approximately parallel to but spaced apart from the bottom of the box, while the other wing may be approximately at right angles and extended into the vicinity of the bottom of the box beside the conduits or cables. A single screw may be passed through the first wing and into the box bottom, so that upon tightening the screw it rocks the plate so as to draw the inturned edge against the conduit or conduits. The clamp therefore comprises a single angle plate and a single screw, in its preferred simplest form, and may be applied or removed through the open top of the box even though the box be embedded in a wall.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a top plan view of an outlet or connection box containing a clamp adapted for two conduits or cables, a portion of the cover being broken away; Fig. 2 is a section on line 2—2 of Fig. 1; Fig. 3 is a section on line 3—3 of Fig. 1; and Fig. 4 is a section on line 4—4 of Fig. 2, the conduits or cables being indicated only in dotted lines.

Referring to the drawing, 1 represents an outlet or connection box of any usual or suitable construction having a detachable cover 2 for the open top. 3 and 4 are armored cables entered loosely through holes located in the bottom of the box near the side wall which, in this instance is shown as being cylindrical.

My improved clamp may be made of a piece of heavy punched sheet metal bent along a line extending entirely across the same to form two wings, 5 and 6, arranged approximately at right angles to each other. The wing 5 has a short tongue 7 projecting from its edge remote from the other wing, and it also has two large holes, 8 and 9, to receive the ends of the cables, and a small hole 10 on the side of the wing opposite that at which the tongue is located. The marginal portion of the wing 6, at the free edge of the latter is bent back so as to underlie the wing 5, as indicated at 11. Notches 12 and 13 are cut in the long free edge of the bent part or flange 11, these notches being preferably V-shaped and so located that their sides will be tangent to a cylinder having the holes 8 and 9 for their ends. The part 11 has also a hole or slot 14 underlying the screw hole 10 in the wing 5.

The parts are so proportioned that when the clamping plate is placed in the box with the tongue 7 extending through a small hole 15 in the side of the box midway between the cables and with the wing 5 parallel with the bottom of the box, the wing 6 will lie on the far side of the cables and the latter will lie in the notches 12 and 13; while the armor or sheathing of the cable will terminate at or below the wing 5 so that the conductors may be carried through the holes 8 and 9. Then, when a screw 16 is passed through the hole 10 and engaged with a screw-threaded hole in the bottom of the box, the tightening of the screw will rock the plate about its hinge connection with the side of the box, drawing the flange 11 over against the cables and firmly clamping the cables in place.

The flange 11 is preferably formed by bending the plate on a gradual curve, and the width of the wing 6 is preferably such that the tip of the flange rests on the bottom of the box. Consequently, when the screw 16 is tightened, the flange yields as it is swung toward the side of the box, but always serves as a supporting foot for the free or swinging end of the clamp. Therefore the clamp forms a positive lock that prevents endwise movement of the cable.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. The combination with a connection box having a hole in the bottom near a side wall, an angle plate arranged within the box and having one wing parallel and spaced apart from the bottom wall and the other wing parallel with the side wall and extending from the inner end of said first wing toward said bottom wall, a screw passing through the first wing and the bottom wall, said side wall and the free end of the first wing having cooperating means interlocked with each other to form a rocking connection, the free edge of the second wing being bent toward the side wall somewhat above said bottom wall to form a lip to engage a conduit extending through said hole, and there being in said first wing a hole in alignment with and of about the same size as said hole in the bottom wall.

2. The combination with a connection box having two holes in the bottom near a side wall, an angle plate overlying said holes, one wing of said plate being parallel with and spaced apart from the bottom wall and having holes in alignment with and of about the same diameter as the holes in the bottom wall, the second wing being approximately at right angles to the bottom wall and extending from the inner end of said first wing toward said bottom wall, a screw passing through the first wing into the bottom wall, the free edge of the first wing having cooperating means interlocked with the side wall to permit the wing to rock, and the free end of the second wing being bent laterally above said bottom and toward the said side wall to form a lip to grip conduits passing through said holes in the bottom wall.

In testimony whereof, I sign this specification.

WILLIAM GOETZELMAN.